United States Patent
Kim et al.

(10) Patent No.: US 8,284,868 B2
(45) Date of Patent: Oct. 9, 2012

(54) MODULATING DEVICE AND METHOD, DEMODULATING DEVICE AND METHOD

(75) Inventors: Dong Kyoo Kim, Daejeon (KR); Jaehwan Kim, Daejeon (KR); Hyung Soo Lee, Daejeon (KR); Jae Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 383 days.

(21) Appl. No.: 12/581,253

(22) Filed: Oct. 19, 2009

(65) Prior Publication Data

US 2010/0135431 A1    Jun. 3, 2010

(30) Foreign Application Priority Data

Dec. 2, 2008  (KR) .......................... 10-2008-0121419

(51) Int. Cl.
*H04L 27/12*  (2006.01)

(52) U.S. Cl. ...................................... 375/302

(58) Field of Classification Search .................. 375/295, 375/302, 308, 316, 322, 329, 343; 329/304
See application file for complete search history.

(56) References Cited

U.S. PATENT DOCUMENTS

| | | | |
|---|---|---|---|
| 6,453,200 B1 | 9/2002 | Koslar | |
| 6,535,073 B1* | 3/2003 | Garg et al. | 332/103 |
| 6,968,016 B1* | 11/2005 | Garg et al. | 375/298 |
| 7,145,934 B2* | 12/2006 | Liang | 375/133 |
| 7,397,300 B2* | 7/2008 | Quinlan et al. | 329/300 |
| 2003/0112893 A1* | 6/2003 | Lee et al. | 375/302 |
| 2007/0140317 A1 | 6/2007 | Birru | |

FOREIGN PATENT DOCUMENTS

| | | |
|---|---|---|
| KR | 1020000052917 A | 8/2000 |
| KR | 1020000061221 A | 10/2000 |
| KR | 1020010111668 A | 12/2001 |
| KR | 2002-0066661 A | 8/2002 |
| KR | 1020060093703 A | 8/2006 |
| WO | 03/065672 A1 | 8/2003 |

OTHER PUBLICATIONS

Dong Kyoo Kim, et al; "Phase-Silence-Shift-Keying for Power-Efficient Modulator", IEICE Trans. Commun., vol. E92-B, No. 6, Jun. 1, 2009, pp. 2324-2326.

* cited by examiner

*Primary Examiner* — Khanh C Tran
(74) *Attorney, Agent, or Firm* — Ladas & Parry LLP

(57) ABSTRACT

A modulation device uses two base signal axes including a cosine function and two base signal axes including a sine function to modulate bit information and generate a modulation symbol. Accordingly, the frequency efficiency characteristic is improved while maintaining a great power efficiency characteristic.

17 Claims, 4 Drawing Sheets

US 8,284,868 B2

MODULATING DEVICE AND METHOD, DEMODULATING DEVICE AND METHOD

CROSS-REFERENCE TO RELATED APPLICATION

This application claims priority to and the benefit of Korean Patent Application No. 10-2008-0121419 filed in the Korean Intellectual Property Office on Dec. 2, 2008, the entire contents of which are incorporated herein by reference.

BACKGROUND OF THE INVENTION (a) Field of the Invention

The present invention relates to a modulation device and method and a demodulation device and method.

(b) Description of the Related Art

In general, a non-linear modulation scheme such as on-off keying (OOK) in the wireless communication system can use a non-linear power amplifier with great power efficiency. However, the performance of the linear modulation schemes such as the phase shift keying (PSK) or the quadrature amplitude modulation (QAM) with great frequency efficiency is degraded when using the non-linear power amplifiers with power efficiency. Therefore, the PSK or QAM modulation scheme with good frequency efficiency has to use the linear power amplifier, and hence, power consumption of a transmitting device is increased. Therefore, many studies for using non-linear power amplifiers with great power efficiency have progressed in the linear and non-linear modulation schemes so as to reduce the transmitting device's power consumption, which can be generally classified as two approach schemes.

The first scheme is to compensate for distortion of a signal generated by a non-linear characteristic by processing an input signal or an output signal of the non-linear power amplifier. The scheme increases wireless communication system complexity and realization cost since it has to configure a complex compensation circuit at the front or rear part of the non-linear power amplifier.

The second scheme is to reduce the linear power amplifier's power consumption by using a linear power amplifier and controlling a bias voltage of the linear power amplifier. Since the scheme can reduce the realization cost compared to the first scheme, studies for controlling the bias voltage of the linear power amplifier are in progress. As the skill for controlling the linear power amplifier's bias voltage is developed, the relationship between power consumption and an instantaneous envelop form of an input signal of the linear power amplifier becomes more important. According to this viewpoint, the modulation scheme including a silence signal such as the pulse position modulation (PPM) or bi-orthogonal PPM (BPPM) is considered as advantageous in reducing power consumption of the linear power amplifier. However, the PPM or BPPM modulation scheme generates very low frequency efficiency because it has a very long silence signal section.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a modulation device and method and a demodulation device and method for improving the frequency efficiency characteristic while maintaining a great power efficiency characteristic.

An exemplary embodiment of the present invention provides a device for modulating input bit information including: a modulation symbol generator for modulating the bit information and generating a modulation symbol by using a plurality of first base signal axes including a cosine function and a plurality of second base signal axes including a sine function, and a transmitter for transmitting the generated modulation symbol.

Another embodiment of the present invention provides a device for demodulating a received signal including: a first matched filter and a second matched filter respectively having a first filter coefficient and a second filter coefficient respectively matching a first base signal axis and a second base signal axis including a cosine function, filtering the received signal with bandwidths having the first filter coefficient and the second filter coefficient, and outputting filtered signals; a third matched filter and a fourth matched filter respectively having a third filter coefficient and a fourth filter coefficient respectively matching the third base signal axis and the fourth base signal axis including a sine function, filtering the received signal with bandwidths having the third filter coefficient and the fourth filter coefficient, and outputting filtered signals; and a signal determining unit for determining bit information transmitted by a transmitting device by using the filtered signals output by the first to fourth matched filters.

Another embodiment of the present invention provides a method for modulating input bit information including: generating a plurality of baseband symbols by mapping the bit information on a symbol; outputting a first pulse signal that is the product of a first baseband symbol and a cosine function; outputting a second pulse signal that is the product of a second baseband symbol and a sine function; adding the first pulse signal and the second pulse signal and outputting the added signal; and generating a modulation symbol by multiplying the added signal and a third baseband symbol.

Another embodiment of the present invention provides a method for demodulating a received signal including: filtering the received signal with bandwidths having a first filter coefficient and a second filter coefficient respectively matching a first base signal axis and a second base signal axis including a cosine function and a third filter coefficient and a fourth filter coefficient respectively matching a third base signal axis and a fourth base signal axis including a sine function, and outputting a filtered signal; and determining bit information transmitted by the transmitting device by using the filtered signal.

According to an embodiment of the present invention, frequency efficiency is improved while the great power efficiency characteristic is maintained.

DETAILED DESCRIPTION OF THE EMBODIMENTS

Figure 1:
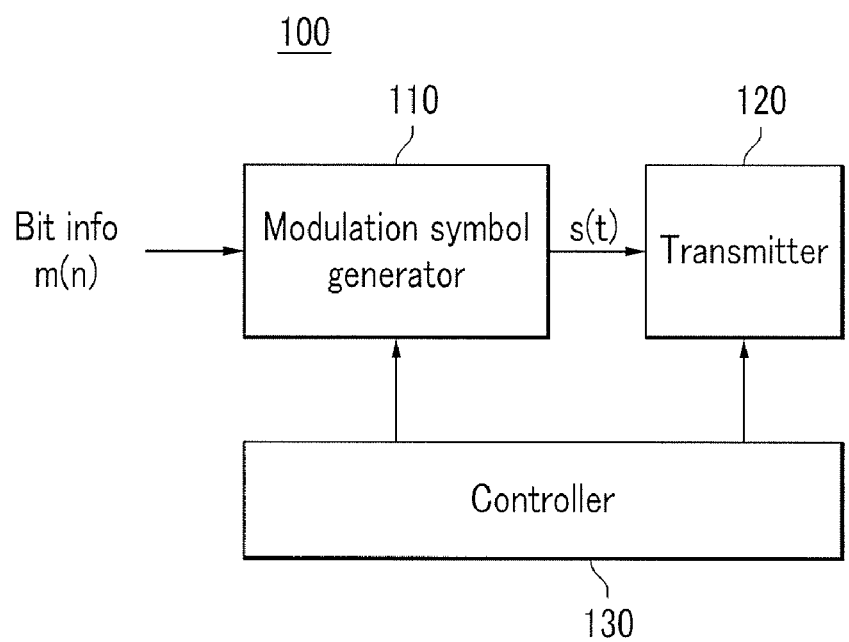
FIG. 1 shows a modulation device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

A modulation device and method and a demodulation device and method according to an exemplary embodiment of the present invention will now be described with reference to accompanying drawings.

FIG. 1 shows a modulation device according to an exemplary embodiment of the present invention.

Referring to FIG. 1, the modulation device 100 includes a modulation symbol generator 110, a transmitter 120, and a controller 130.

The modulation symbol generator 110 performs phase silence shift keying (PSSK) modulation on bit information [m(n)] to be transmitted to generate a modulation symbol [s(t)]. In this instance, the PSSK modulation can be expressed as Equation 1, and $g_{m(n)}(t)$ can be expressed as Equation 2.

$$s(t) = \sum_{n=0}^{\infty} \text{Re}\{g_{m(n)}(t-nT)e^{j2\pi \bmod(m(n),0.5M)/0.5M} e^{j2\pi f_c(t-nT)}\}, \quad \text{(Equation 1)}$$
$$0 \leq t \leq T$$

$$g_{m(n)}(t) = \begin{cases} \sqrt{E_s}\,u(t) - \sqrt{E_s}\,u(t-0.5T), & m(n) = 0, 1, \ldots, \\ & M/2 - 1 \\ \sqrt{E_s}\,u(t-0.5T) - & m(n) = M/2, \ldots, \\ \sqrt{E_s}\,u(t-T), & M-1 \end{cases} \quad \text{(Equation 2)}$$

Here, M is the number of symbols, for example, when M is 4, it means there are 4 symbols that have 2-bit information, and when M is 8, it means that there are 8 symbols that have 3-bit information. That is, M indicates the number of symbols having $\log_2(M)$-bit information. T represents a time for one symbol interval, and t indicates time. $f_c$ shows a carrier frequency, $E_s$ is energy of the symbol, and u(t) is a unit step function and can be expressed as Equation 3.

$u(t)=1$, if $t \geq 0$ $u(t)=0$, if $t < 0$ \qquad (Equation 3)

When u(t) is applied, $g_{m(n)}(t)$ becomes a pulse signal, $g_{m(n)}(t)$ when m(n) is 0, 1, ..., M/2−1 becomes a pulse signal that has a signal during the former T/2 interval of the T interval and that has no signal during the latter T/2 interval, and $g_{m(n)}(t)$ when m(n) is M/2, ..., M−1 becomes a pulse signal that has no signal during the former T/2 interval of the T section and that has a signal during the latter T/2 interval. That is, $g_{m(n)}(t)$ when m(n) is 0, 1, ..., M/2−1 has an inverse signal of $g_{m(n)}(t)$ when m(n) is M/2, ..., M−1, and $g_{m(n)}(t)$ has a sound signal interval and a silence signal interval.

The transmitter 120 transmits the generated modulation symbol [s(t)].

The controller 130 controls the modulation symbol generator 110 so that the bit information [m(n)] to be transmitted may be PSSK modulated, and controls the transmitter 120 so as to transmit the modulation symbol [s(t)] generated by the modulation symbol generator 110.

Figure 2:
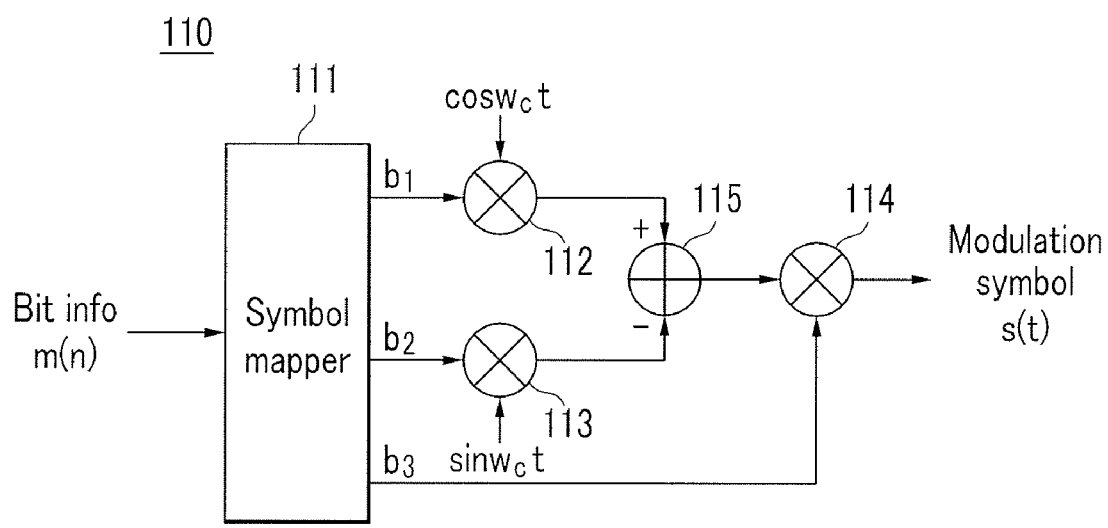
FIG. 2 shows a modulation symbol generator shown in FIG. 1.

FIG. 2 shows a modulation symbol generator shown in FIG. 1.

Referring to FIG. 2, the modulation symbol generator 110 includes a symbol mapper 111, multipliers 112, 113, and 114, and an adder 115.

The symbol mapper 111 maps the bit information [m(n)] to generate baseband symbols $b_1$, $b_2$, and $b_3$. In this instance, the symbol mapper 111 generates the baseband symbols $b_1$, $b_2$, and $b_3$ according to the definition of $e^{2\pi \bmod(m(n),0.5M)/0.5M}$ in Equation 1 and $g_{m(n)}(t)$, the baseband symbols $b_1$ and $b_2$ correspond to $e^{2\pi \bmod(m(n),0.5M)/0.5M}$ in Equation 1, and the baseband symbol $b_3$ corresponds to $g_{m(n)}(t)$.

The multiplier 112 multiplies the baseband symbol $b_1$ by the cosine function ($\cos w_c t$) and outputs the result to the adder 115, and the multiplier 113 multiplies the baseband symbol $b_2$ by the since function ($\sin w_c t$) and outputs the result to the adder 115. In this instance, $w_c$ is $2\pi f_c$.

The adder 115 adds the output of the multiplier 112 and the output of the multiplier 113 to output the result to the multiplier 114.

The multiplier 114 multiplies the output of the adder 115 by the baseband symbol $b_3$ to output the result as a modulation symbol [s(t)].

In this instance, since $g_{m(n)}(t)$ is expressed as Equation 2, the modulation symbol [s(t)] can be expressed as generated by using 4 base signal axes shown in Equations 4 to 7.

$x_1(t) = g_{m<M/2}(t)\cos 2\pi f_c t$ \qquad (Equation 4)

$x_2(t) = g_{m<M/2}(t)\sin 2\pi f_c t$ \qquad (Equation 5)

$x_3(t) = g_{m \geq M/2}(t)\cos 2\pi f_c t$ \qquad (Equation 6)

$x_4(t) = g_{m \geq M/2}(t)\sin 2\pi f_c t$ \qquad (Equation 7)

According to the PSSK modulation scheme, since the symbol's energy ($E_s$) is concentrated on the T/2 interval, the frequency efficiency becomes ½ the PSK modulation scheme. That is, since the PSK modulation scheme's frequency efficiency is $$\frac{1}{2}\log_2 M,$$

the frequency efficiency of the PSSK modulation scheme according to the exemplary embodiment of the present invention becomes $$\frac{1}{4}\log_2 M.$$

On the contrary, since the frequency efficiency of the BPPM modulation scheme with great power efficiency is $$\frac{1}{M}\log_2 M,$$

the frequency efficiency of the PSSK modulation scheme according to the exemplary embodiment of the present invention has greater frequency efficiency than the BPPM modulation scheme.

Also, since the PSSK modulation scheme has no signal during the ½T interval, power efficiency can be improved by applying the bias voltage skill of the linear power amplifier during the ½T interval without any signal.

Also, the minimum distance ($d_{psk}$) between modulation symbols according to the PSK modulation scheme can be computed as expressed in Equation 8, and the minimum distance ($d_{pssk}$) between the modulation symbols according to the PSSK modulation scheme can be computed as shown in Equation 9.

$$d_{PSK}=2\times\sqrt{(\log 2(M)*E_b)}\times\sin(\pi/M) \quad \text{(Equation 8)}$$

$$d_{PSSK}=2\times\sqrt{[(\log 2(M)-1]*E_b)}\times\sin(2\pi/M) \quad \text{(Equation 9)}$$

That is, when M is 4, the minimum distances ($d_{psk}$, $d_{pssk}$) between the modulation symbols according to the PSK and PSSK modulation schemes are 2, when M is 8, the minimum distances ($d_{psk}$, $d_{pssk}$) between the modulation symbols according to the PSK and PSSK modulation schemes are 1.326 and 2 respectively, and when M is 16, the minimum distances ($d_{psk}$, $d_{pssk}$) between the modulation symbols according to the PSK and PSSK modulation schemes are 0.78 and 1.326 respectively, and hence, the minimum distance ($d_{psk}$) between the modulation symbols according to the PSSK modulation scheme becomes greater than the minimum distance ($d_{pssk}$) between the modulation symbols according to the PSK modulation scheme as M becomes greater, and the PSSK modulation scheme reduces the received error probability compared to the PSK modulation scheme.

The received error probability ($P_M$) according to the PSSK modulation scheme according to the exemplary embodiment of the present invention can be found as expressed in Equation 10.

$$P_M = 1 - \int_{-2\pi/M}^{2\pi/M}\int_{-r_1}^{r_1}\int_{-r_1}^{r_1} p_{r_3,r_4}(r_3, r_4)dr_3 dr_4 \cdot p_\theta(\theta)d\theta \quad \text{(Equation 10)}$$

$$\theta = \tan^{-1}\frac{r_2}{r_1},$$

$$p_{r_3,r_4}(r_3, r_4) = \frac{1}{2\pi N_0}\exp\left[-\frac{(r_3^2 + r_4^2)}{N_0}\right],$$

Here, $$p_\theta(\theta) = \left(2\pi e^{E_s N_0^{-1}\sin^2\theta}\right)^{-1}\int_0^\infty V e^{-\left(V-\sqrt{2E_s N_0^{-1}}\cos\theta\right)^2/2}dV,$$

and $N_0$ is spectral density of the additive white Gaussian noise (AWGN). In this instance, since Equation 3 cannot be expressed more simply, the upper value ($P_U$) of the received error probability ($P_M$) is expressed in Equation 11.

$$P_U = \frac{1}{M}\sum_{m=1}^{M}\sum_{j\in A_m} Q\left(\frac{d_{m,j}}{\sqrt{2N_0}}\right) \quad \text{(Equation 11)}$$

Here, $A_m$ is a set of the most adjacent modulation symbols, and $d_{m,j}(=2\sqrt{E_s}\sin(\pi/M))$ represents the distance between the m-th modulation symbol and the j-th modulation symbol.

Figure 3:
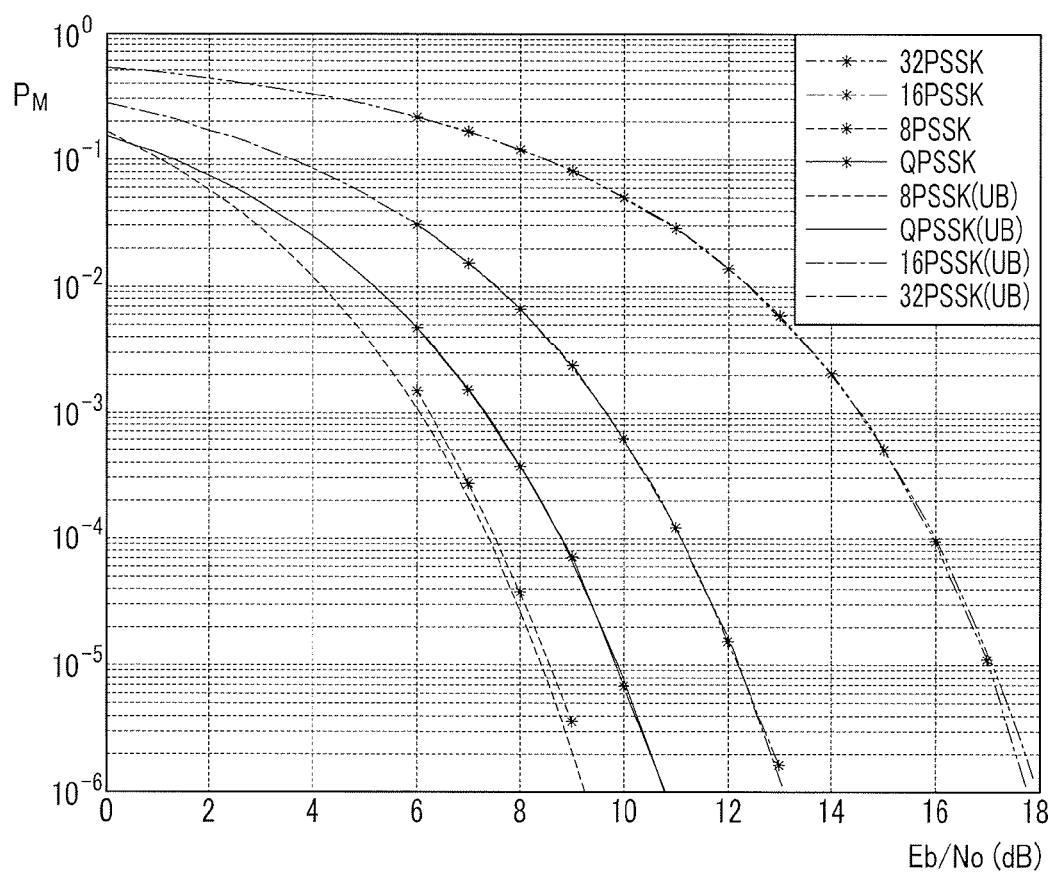
FIG. 3 shows a graph for comparing a received error probability based on the PSSK modulation scheme according to an exemplary embodiment of the present invention and the upper value of the received error probability.

FIG. 3 shows a graph for comparing a received error probability based on the PSSK modulation scheme according to an exemplary embodiment of the present invention and the upper value of the received error probability. Referring to FIG. 3, the QPSSK, 8PSSK, 16PSSK, and 32PSSK are the PSSK according to M, the QPSSK represents the PSSK when M is 4, and the 8PSSK, 16PSSK, and 32PSSK indicate the PSSK's when M is 8, 16, and 32 respectively. Also, "UB" represents the upper value ($P_U$) of the received error probability ($P_M$). The graph of FIG. 3 shows a simulation for indicating accuracy of the upper value ($P_U$) of the received error probability ($P_M$), illustrating that when the signal-to-noise ratio (SNR) (Eb/No) is increased, the upper values ($P_U$) of the received error probability ($P_M$) and the received error probability ($P_M$) become very much less different.

Figure 4:
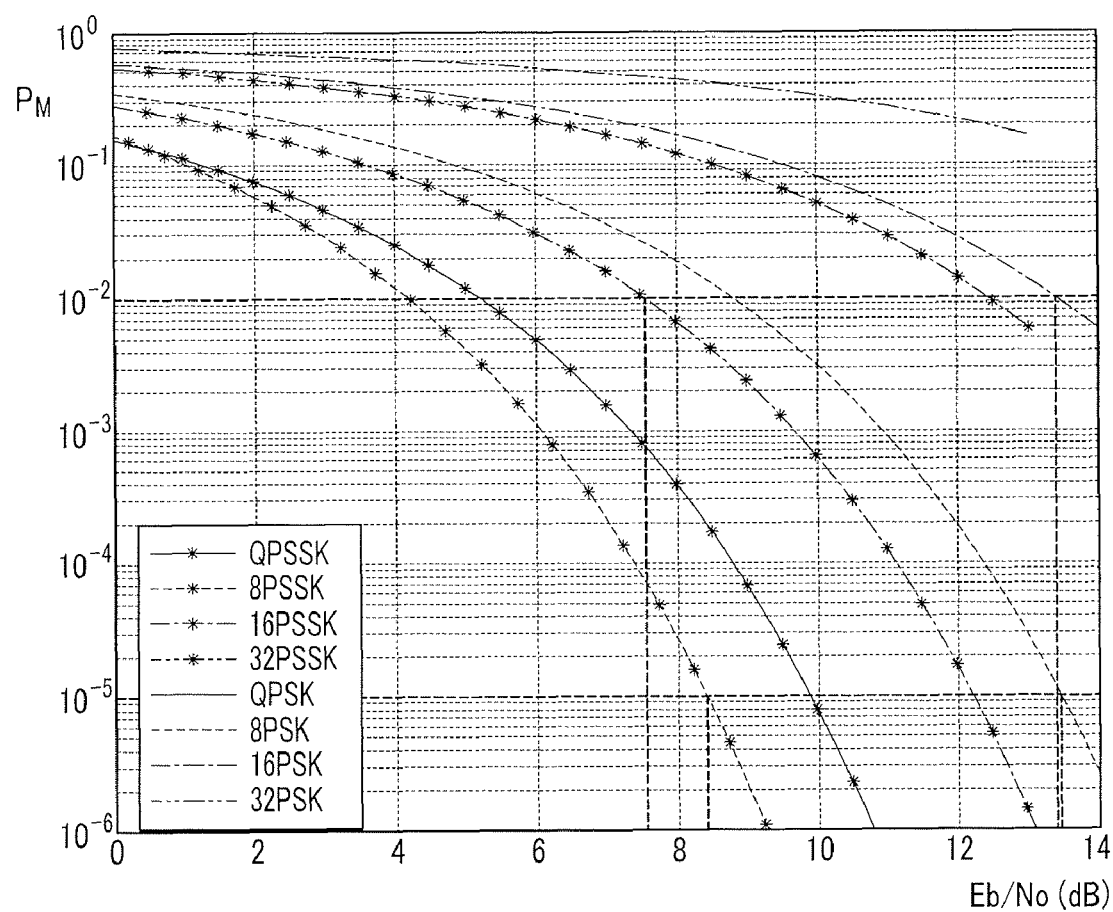
FIG. 4 shows a graph for showing a received error probability according to the PSSK modulation scheme according to an exemplary embodiment of the present invention.

FIG. 4 is a graph for showing a received error probability according to the PSSK modulation scheme according to an exemplary embodiment of the present invention.

Referring to FIG. 4, in the PSSK modulation scheme, the upper value ($P_U$) of the received error probability ($P_M$) of the PSSK modulation scheme is less than the upper value ($P_U$) of the received error probability ($P_M$) according to the PSK modulation scheme depending on M.

Also, when comparing the 8PSSK modulation scheme with M of 8 and the power efficiency of the 8PSSK modulation scheme, when the upper value ($P_U$) of the received error probability ($P_M$) is $10^{-5}$, the signal-to-noise ratio (SNR) (Eb/No) of the 8PSSK modulation scheme is 8.5 and the signal-to-noise ratio (SNR) (Eb/No) of the 8PSK modulation scheme is 13.5, and so their difference is substantially 5 dB, and when comparing the 16PSSK modulation scheme with M of 16 and the power efficiency of the 16PSSK modulation scheme, when the upper value ($P_U$) of the received error probability ($P_M$) is $10^{-2}$, the SNR (Eb/No) of the 16PSSK modulation scheme is 7.5 and the SNR (Eb/No) of the 16PSK modulation scheme is 13.5 and so their difference is substantially 6 dB. That is, the power efficiency according to the PSSK modulation scheme is improved compared to the power efficiency according to the PSK modulation scheme. That is, when M is greater than 8, the power efficiency of the PSSK modulation scheme according to the exemplary embodiment of the present invention is improved compared to the PSK modulation scheme.

Figure 5:
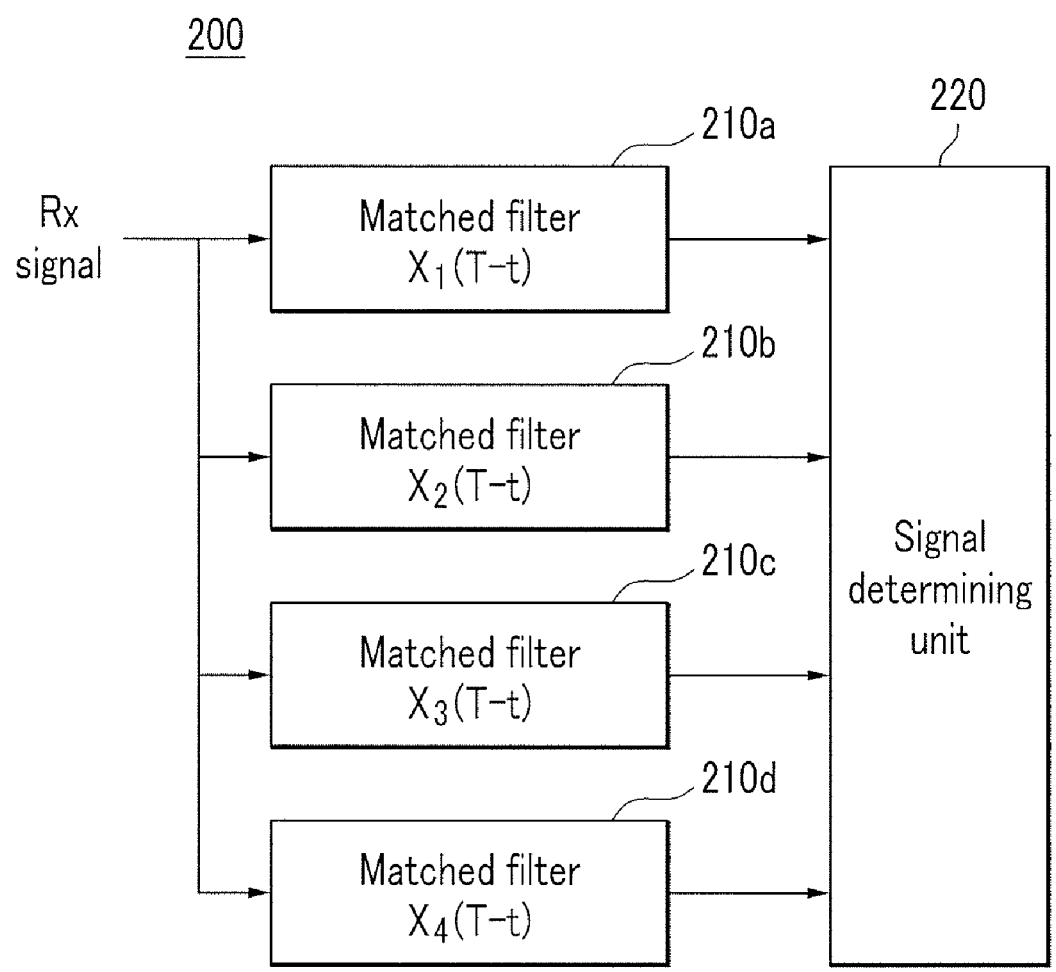
FIG. 5 shows a demodulation device according to an exemplary embodiment of the present invention.

FIG. 5 shows a demodulation device according to an exemplary embodiment of the present invention.

Referring to FIG. 5, the demodulation device 200 includes matched filters (210a-210d) and a signal determining unit 220.

Since the matched filters 210a to 210d respectively have a filter coefficient matching the characteristic of the orthogonal base signal axis shown in Equations 4 to 7, and filter the received signal with a bandwidth having the filter coefficient and output the result, the matched filters 210a to 210d output the maximum value when receiving the corresponding received signal.

The signal determining unit 220 samples the signals output by the matched filters 210a to 210d during one symbol interval time T, detects the upper value from the sampled signals, and determines bit information [m(n)] by using the detected upper value.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for modulating input bit information, comprising:
 a modulation symbol generator for modulating the bit information and generating a modulation symbol by using one first base signal axis and one second base signal axis from among a plurality of first base signal axes including a cosine function and a plurality of second base signal axes including a sine function,
 wherein the plurality of first base signal axes comprise a signal axis that is a product of the cosine function and a first pulse signal, and a signal axis that is a product of the cosine function and a second pulse signal, and the plurality of second base signal axes comprise a signal axis that is a product of the sine function and the first pulse signal, and a signal axis that is a product of the sine function and the second pulse signal,
 wherein the first pulse signal and the second pulse signal each comprise a sound signal and a silence signal, and the first pulse signal and the second pulse signal are inverted with respect to each other; and
 a transmitter for transmitting the generated modulation symbol.

2. The device of claim 1, wherein the modulation symbol generator selects the one first base signal axis and the one second base signal axis from among the plurality of first and second base signal axes according to the input bit information.

3. The device of claim 1, wherein the modulation symbol generator includes:
 a symbol mapper for generating a plurality of baseband symbols by mapping the bit information on a symbol;
 a first multiplier for outputting a third pulse signal that is the product of the first baseband symbol and the cosine function;
 a second multiplier for outputting a fourth pulse signal that is the product of the second baseband symbol and the sine function;
 an adder for adding the third pulse signal and the fourth pulse signal and outputting an addition signal; and
 a third multiplier for generating the modulation symbol by multiplying the addition signal and a third baseband symbol.

4. The device of claim 3, wherein the first pulse signal or the second pulse signal is determined to be the third baseband symbol according to the input bit information.

5. A device for demodulating a received signal comprising:
 a first matched filter and a second matched filter respectively having a first filter coefficient and a second filter coefficient respectively matching a first base signal axis and a second base signal axis including a cosine function, filtering the received signal with bandwidths having the first filter coefficient and the second filter coefficient, and outputting filtered signals;
 a third matched filter and a fourth matched filter respectively having a third filter coefficient and a fourth filter coefficient respectively matching a third base signal axis and a fourth base signal axis including a sine function, filtering the received signal with bandwidths having the third filter coefficient and the fourth filter coefficient, and outputting filtered signals;
 a signal determining unit for determining bit information transmitted by a transmitting device by using the filtered signals output by the first to fourth matched filters.

6. The device of claim 5, wherein the first base signal axis is the product of the cosine function and a first pulse signal, the second base signal axis is a product of the cosine function and a second pulse signal, the third base signal axis is a product of the sine function and the first pulse signal, and the fourth base signal axis is a product of the sine function and the second pulse signal.

7. The device of claim 6, wherein the first pulse signal comprises an inverted form of the second pulse signal.

8. The device of claim 5, wherein the received signal is modulated by using one of the first and second base signal axes and one of the third and fourth base signal axes according to the transmitted bit information.

9. A method for modulating input bit information, comprising:
 generating a plurality of baseband symbols by mapping the bit information on a symbol;
 outputting a first pulse signal that is a product of a first baseband symbol and a cosine function;
 outputting a second pulse signal that is a product of a second baseband symbol and a sine function;
 adding the first pulse signal and the second pulse signal and outputting the added signal; and
 generating a modulation symbol by multiplying the added signal and a third baseband symbol.

10. The method of claim 9, wherein a third pulse signal or a fourth pulse signal is determined to be the third baseband symbol according to the input bit information, and the third pulse signal comprises an inverted form of the fourth pulse signal.

11. The method of claim 9 further comprising: transmitting the generated modulation symbol.

12. The method of claim 9, wherein the modulation symbol is generated by using a first base signal axis and a second base signal axis from among the plurality of first and second base signal axes according to the input bit information.

13. The method of claim 12, wherein the plurality of first base signal axes comprise a signal axis that is a product of the cosine function and a third pulse signal, and a signal axis that is a product of the cosine function and a fourth pulse signal, and the plurality of second base signal axes comprise a signal axis that is a product of the sine function and the third pulse signal, and a signal axis that is a product of the sine function and the fourth pulse signal.

14. The method of claim 13, wherein the third pulse signal and the fourth pulse signal are inverted with respect to other, and the third pulse signal and the fourth pulse signal each comprise a sound signal and a silence signal.

15. A method for demodulating a received signal, comprising:
 filtering the received signal with bandwidths having a first filter coefficient and a second filter coefficient respectively matching a first base signal axis and a second base signal axis including a cosine function and a third filter coefficient and a fourth filter coefficient respectively matching a third base signal axis and a fourth base signal axis including a sine function, and outputting a filtered signal; and
 determining bit information transmitted by a transmitting device by using the filtered signal.

16. The method of claim 15, wherein the received signal is modulated by using one of the first and second base signal axes and one of the third and fourth base signal axes according to the transmitted bit information.

17. The method of claim 16, wherein the first base signal axis is a product of the cosine function and a first pulse signal, the second base signal axis is a product of the cosine function and a second pulse signal, the third base signal axis is a product of the sine function and the first pulse signal, and the fourth base signal axis is a product of the sine function and the second pulse signal, and the first pulse signal comprises an inverted form of the second pulse signal.

* * * * *